United States Patent
Frey et al.

(10) Patent No.: US 8,628,871 B2
(45) Date of Patent: Jan. 14, 2014

(54) HIGH DURABILITY FUEL CELL COMPONENTS WITH CERIUM SALT ADDITIVES

(75) Inventors: Matthew H. Frey, Cottage Grove, MN (US); Daniel M. Pierpont, North St. Paul, MN (US); Steven J. Hamrock, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1336 days.

(21) Appl. No.: 11/262,268

(22) Filed: Oct. 28, 2005

(65) Prior Publication Data

US 2007/0099053 A1    May 3, 2007

(51) Int. Cl.
*H01M 8/10* (2006.01)
(52) U.S. Cl.
USPC .............................. 429/33; 521/27
(58) Field of Classification Search
USPC .............................. 429/33; 521/27
See application file for complete search history.

(56) References Cited

U.S. PATENT DOCUMENTS

| | | |
|---|---|---|
| 3,369,938 A | 2/1968 | Kroeger et al. |
| 3,382,105 A | 5/1968 | McBryar et al. |
| 4,021,369 A | 5/1977 | Lyons |
| 4,284,835 A | 8/1981 | Kim et al. |
| 4,340,276 A | 7/1982 | Maffitt et al. |
| 4,358,545 A | 11/1982 | Ezzell et al. |
| 4,416,801 A | 11/1983 | Waller |
| 4,433,082 A | 2/1984 | Grot |
| 4,568,598 A | 2/1986 | Bilkadi et al. |
| 4,741,744 A | 5/1988 | Wu et al. |
| 4,752,369 A | 6/1988 | Caldwell et al. |
| 4,812,352 A | 3/1989 | Debe |

(Continued)

FOREIGN PATENT DOCUMENTS

| | | |
|---|---|---|
| EP | 0 459 820 B1 | 4/1991 |
| EP | 0 631 337 B1 | 7/2000 |

(Continued)

OTHER PUBLICATIONS

Goering et al., "Role of Ion-Exchange Membrane Morphology and Sorption Properties in Facilitated Transport di-olefin/mono-olefin Separations", Journal of Membrane Science, vol. 144, 1998, pp. 133-143.

(Continued)

*Primary Examiner* — Peter D. Mulcahy
*Assistant Examiner* — Henry Hu
(74) *Attorney, Agent, or Firm* — Gregory D. Allen

(57) ABSTRACT

A fuel cell membrane electrode assembly is provided comprising a polymer electrolyte membrane which comprises a polymer that comprises bound anionic functional groups, wherein the polymer electrolyte membrane additionally comprises cerium cations. In another aspect, a fuel cell membrane electrode assembly is provided comprising a polymer electrolyte membrane which comprises a polymer that comprises bound anionic functional groups, wherein at least a portion of the anionic functional groups are in acid form and at least a portion of the anionic functional groups are neutralized by cerium cations. In another aspect, a polymer electrolyte membrane is provided which comprises a polymer that comprises bound anionic functional groups, wherein the polymer electrolyte membrane additionally comprises cerium cations, and wherein the amount of cerium cations present is between 0.001 and 0.5 charge equivalents based on the molar amount of acid functional groups present in the polymer electrolyte, more typically between 0.005 and 0.2, more typically between 0.01 and 0.1, and more typically between 0.02 and 0.05.

21 Claims, 1 Drawing Sheet

(56) References Cited

U.S. PATENT DOCUMENTS

| | | | |
|---|---|---|---|
| 4,824,835 | A | 4/1989 | Mertens et al. |
| 4,866,099 | A | 9/1989 | Hendy |
| 5,039,561 | A | 8/1991 | Debe |
| 5,176,786 | A | 1/1993 | Debe |
| 5,186,877 | A | 2/1993 | Watanabe |
| 5,221,455 | A | 6/1993 | Hanada et al. |
| 5,225,391 | A | 7/1993 | Stonehart et al. |
| 5,294,232 | A | 3/1994 | Sakairi et al. |
| 5,336,558 | A | 8/1994 | Debe |
| 5,338,430 | A | 8/1994 | Parsonage et al. |
| 5,472,799 | A | 12/1995 | Watanabe |
| 5,523,181 | A | 6/1996 | Stonehart et al. |
| 5,766,787 | A | 6/1998 | Watanabe et al. |
| 5,766,788 | A | 6/1998 | Inoue et al. |
| 5,840,192 | A | 11/1998 | El Moussaoui et al. |
| 5,879,827 | A | 3/1999 | Debe et al. |
| 5,879,828 | A | 3/1999 | Debe et al. |
| 5,958,822 | A | 9/1999 | Beckerbauer et al. |
| 6,040,077 | A | 3/2000 | Debe et al. |
| 6,059,943 | A | 5/2000 | Murphy et al. |
| 6,156,184 | A | 12/2000 | Antonucci et al. |
| 6,242,135 | B1 | 6/2001 | Mushiake |
| 6,319,293 | B1 | 11/2001 | Debe et al. |
| 6,335,112 | B1 | 1/2002 | Asukabe et al. |
| 6,624,328 | B1 | 9/2003 | Guerra |
| 6,630,263 | B1 | 10/2003 | McElroy |
| 6,635,384 | B2 | 10/2003 | Bahar et al. |
| 6,649,295 | B2 | 11/2003 | Hamrock et al. |
| 6,680,138 | B1 | 1/2004 | Honma et al. |
| 6,864,006 | B2 | 3/2005 | Honma et al. |
| 7,220,509 | B2 | 5/2007 | Merzougui et al. |
| 7,879,475 | B2 | 2/2011 | Toyoda |
| 7,989,115 | B2 | 8/2011 | Durante |
| 2002/0004453 | A1 | 1/2002 | Haugen et al. |
| 2002/0015875 | A1 | 2/2002 | Kim |
| 2002/0058172 | A1 | 5/2002 | Datz et al. |
| 2002/0076594 | A1 | 6/2002 | Fukuda et al. |
| 2002/0093008 | A1* | 7/2002 | Kerres et al. .............. 252/500 |
| 2002/0132157 | A1 | 9/2002 | Finkelshtain et al. |
| 2003/0008196 | A1 | 1/2003 | Wessel et al. |
| 2003/0013004 | A1 | 1/2003 | Oyanagi et al. |
| 2004/0043283 | A1 | 3/2004 | Cipollini et al. |
| 2004/0048129 | A1 | 3/2004 | Taft, III et al. |
| 2004/0048466 | A1 | 3/2004 | Gore et al. |
| 2004/0053098 | A1 | 3/2004 | Schiffrin et al. |
| 2004/0116742 | A1 | 6/2004 | Guerra |
| 2004/0121210 | A1 | 6/2004 | Hamrock et al. |
| 2004/0251450 | A1 | 12/2004 | Kerres et al. |
| 2005/0069755 | A1 | 3/2005 | Vernstrom et al. |
| 2005/0136308 | A1 | 6/2005 | Andrews et al. |
| 2006/0019140 | A1* | 1/2006 | Kawazoe et al. .............. 429/33 |
| 2006/0046120 | A1 | 3/2006 | Merzougui et al. |
| 2006/0099475 | A1* | 5/2006 | Watanabe et al. .............. 429/33 |
| 2006/0099476 | A1 | 5/2006 | Watakabe |
| 2006/0166069 | A1 | 7/2006 | Min |
| 2006/0231484 | A1 | 10/2006 | Haring et al. |
| 2006/0280985 | A1 | 12/2006 | Toyoda |
| 2007/0099052 | A1 | 5/2007 | Frey et al. |
| 2008/0118808 | A1 | 5/2008 | Tayanagi |

FOREIGN PATENT DOCUMENTS

| | | | |
|---|---|---|---|
| EP | 1 133 806 B1 | | 9/2002 |
| EP | 1 657 772 | | 5/2006 |
| EP | 1 662 595 | | 5/2006 |
| EP | 1 772 919 | | 4/2007 |
| GB | 149233 | | 1/1922 |
| GB | 1 449 233 | | 9/1976 |
| GB | 1534359 | | 6/1978 |
| JP | 54-82042 | A2 | 6/1979 |
| JP | 2000-106203 | | 4/2000 |
| JP | 2001-118591 | | 4/2001 |
| JP | 2001-321664 | | 11/2001 |
| JP | 2003-059497 | | 2/2003 |
| JP | 2003-123777 | A2 | 4/2003 |
| JP | HEI-2003-282097 | | 10/2003 |
| JP | 2004-018573 | * | 1/2004 |
| JP | 2004-134294 | | 4/2004 |
| JP | 1 627 3384 | | 9/2004 |
| JP | 2005-235437 | | 9/2005 |
| JP | 2006-099999 | | 4/2006 |
| JP | 2006-107914 | | 4/2006 |
| JP | 2006-260811 | | 9/2006 |
| JP | 2006-324094 | | 11/2006 |
| KR | 2000-063843 | | 6/2000 |
| WO | WO 00/24074 | | 4/2000 |
| WO | WO 01/54216 | A2 | 7/2001 |
| WO | WO 02/061871 | A2 | 8/2002 |
| WO | WO 03/007412 | A1 | 1/2003 |
| WO | WO 03/072854 | A2 | 9/2003 |
| WO | WO 2005/060039 | A1 | 6/2005 |

OTHER PUBLICATIONS

M. Debe, A. Steinbach, K. Lewinski, G. Haugen, G. Vernstrom, R. Atanasoski, A. Hester, P. Turner, R. Ziegler, J. Larson, M. Hicks, and P. Serim; "Activities of Low Pt Loading, Carbon-Less, Ultra-Thin Nanostructured Film-Based Electrodes for PEM Fuel Cells and Roll-Good Fabricated MEA Performances in Single Cells and Stacks", 2003 Fuel Cell Seminar, Fuel Cells for Secure, Sustainable Energy, Abstracts, Nov. 3-7, 2003, Miami Beach, Florida, Fontainebleau Hilton Hotel, pp. 812-815.

G. M. Chow et al.; "Fabrication of Biologically Based Microstructure Composites for Vacuum Field Emission", Materials Science and Engineering, A158, 1992, pp. 1-6.

K. K. Kam, M. K. Debe, R. J. Poirier, and A. R. Drube; "Summary Abstract: Dramatic Variation of the Physical Microstructure of a Vapor Deposited Organic Thin Film", J. Vac. Sci. Technol, A, 5(4), Jul./Aug. 1987, pp. 1914-1916.

M. K. Debe, K. K. Kam, J. C. Liu, and R. J. Poirier; "Vacuum Vapor Deposited Thin Films of a Perylene Dicarboximide Derivative: Microstructure Versus Deposition Parameters", J. Vac. Sci. Technol. A, 6 (3), May/Jun. 1988, pp. 1907-1911.

M. K. Debe and R. J. Poirier; "Effect of Gravity on Copper Phthalocyanine Thin Films,III: Microstructure Comparisons of Copper Phthalocyanine Thin Films Grown in Microgravity and Unit Gravity", Thin Solid Films, vol. 186, 1990, pp. 327-347.

Y. Sadaoka, T. A. Jones, G. S. Revell, W. Gopel; Effects of Morphology on $NO_2$ Detection in Air At Room Temperature With Phthalocyanine Thin Films, Journal of Materials Science, vol. 25, 1990, pp. 5257-5268.

S. Ohnuma, Y. Nakanouchi, and T. Masumoto; "Amorphous Ultrafine Metallic Particles Prepared by Sputtering Method", Rapidly Quenched Metals, Proc. of the Fifth Int. Conf. on Rapidly Quenched Metals, Wurzburg, Germany, Sep. 3-7, 1984, S. Steeb et al., eds., Elsevier Science Publisher B.V., New York, 1985, pp. 1117-1124.

P. K. Lee and M. K. Debe, "Measurement and Modeling of the Reflectance-Reducing Properties of Gradient Index Microstructured Surfaces", Photographic Science and Engineering, vol. 24, (4), Jul./Aug. 1980, pp. 211-216.

H. Tang, J. H. Chen, Z. P. Huang, D. Z. Wang, Z. F. Ren, L. H. Nie, Y. F. Kuang, and S. Z. Yao; "High Dispersion and Electrocatalytic Properties of Platinum on Well-Aligned Carbon Nanotube Arrays", Carbon, vol. 42, 2004, pp. 191-197.

A. Bonakdarpour et al., "Corrosion of Transition Metals, in $Pt_{1-x}M_x$ Proton Exchange Membrane Fuel Cell Electrocatalysts", 2004 Fall Meeting of the Electrochemical Society of Japan, Hawaii, Oct. 3-8, 2004.

U.S. Appl. No. 10/945,178, filed Sep. 20, 2004, "Fuel Cell Durability", now pending.

U.S. Appl. No. 10/944,998, filed Sep. 20, 2004, "Durable Fuel Cell", now pending.

U.S. Appl. No. 11/248,441, filed Oct. 12, 2005, "Ternary Nanocatalyst and Method of Making", now pending.

Sang-Hee Kwak, TaeHyun Yang, Chang-Soo Kim, and Ki Hyun Yoon; "Performance Evaluation of Platinum Dispersed Self-Humidi-

(56) References Cited

OTHER PUBLICATIONS fying Polymer Electrolyte Membrance Prepared by Using RF Magnetron Sputter", *Journal of the Korean Ceramic Society*, vol. 40, No. 2, 2003, pp. 118-122.

A. Michas, J. M. Kelly, R. Durand, M. Pineri, and J.M.D. Coey; "Preparation, Characterization and Catalytic Properties of Perfluorosulfonated Ion-Exchange Membranes Containing Surface-Concentrated, Hydrated Ruthenium Oxide Particles"; Journal of Membrane Science, Elsevier Science Publishers B.V., Amsterdam—Printed in The Netherlands; vol. 29, No. 3, Dec. 15, 1986, pp. 239-257.

Mikael Ludvigsson, Jan Lindgren, and Jörgen Tegenfeldt; "Incorporation and Characterisation of Oxides of Manganese, Cobalt, and Lithium Into Nafion 117 Membranes", Journal Materials Chemistry, vol. 11, Feb. 15, 2001, pp. 1269-1276.

Fuqiang Liu, Baolian Yi, Danmin Xing, Jingrong Yu, Zhongjun Hou, Yongzhu Fu; "Development of Novel Self-Humidifying Composite Membranes for Fuel Cells", *Journal of Power Sources*, vol. 124, 2003, pp. 81-89.

J. Guan and G. Li, "Studies on Preparation of Ultrafine MnO Particles and Its Eletrocatalytic Performance in PEMFC", Huaxue Shijie 43 [1] (2002) pp. 7-9.

S. Kawatsu and M. Iwase, "Electrocatalysts for Polymer Electrolyte Fuel Cells", Jidosha Gijutsukai Ronbunshu (Transaction of the Society Automotive Engineers of Japan), vol. 28, No. 4, (Oct. 1997), pp. 39-42.

Dupont™ Nafion® PFSA Products Perfluorosulfonic Acid Polymer Technical Information; "Safe Handling and Use of Perfluorosulfonic Acid Products", Feb. 2004, pp. 1-4.

\* cited by examiner

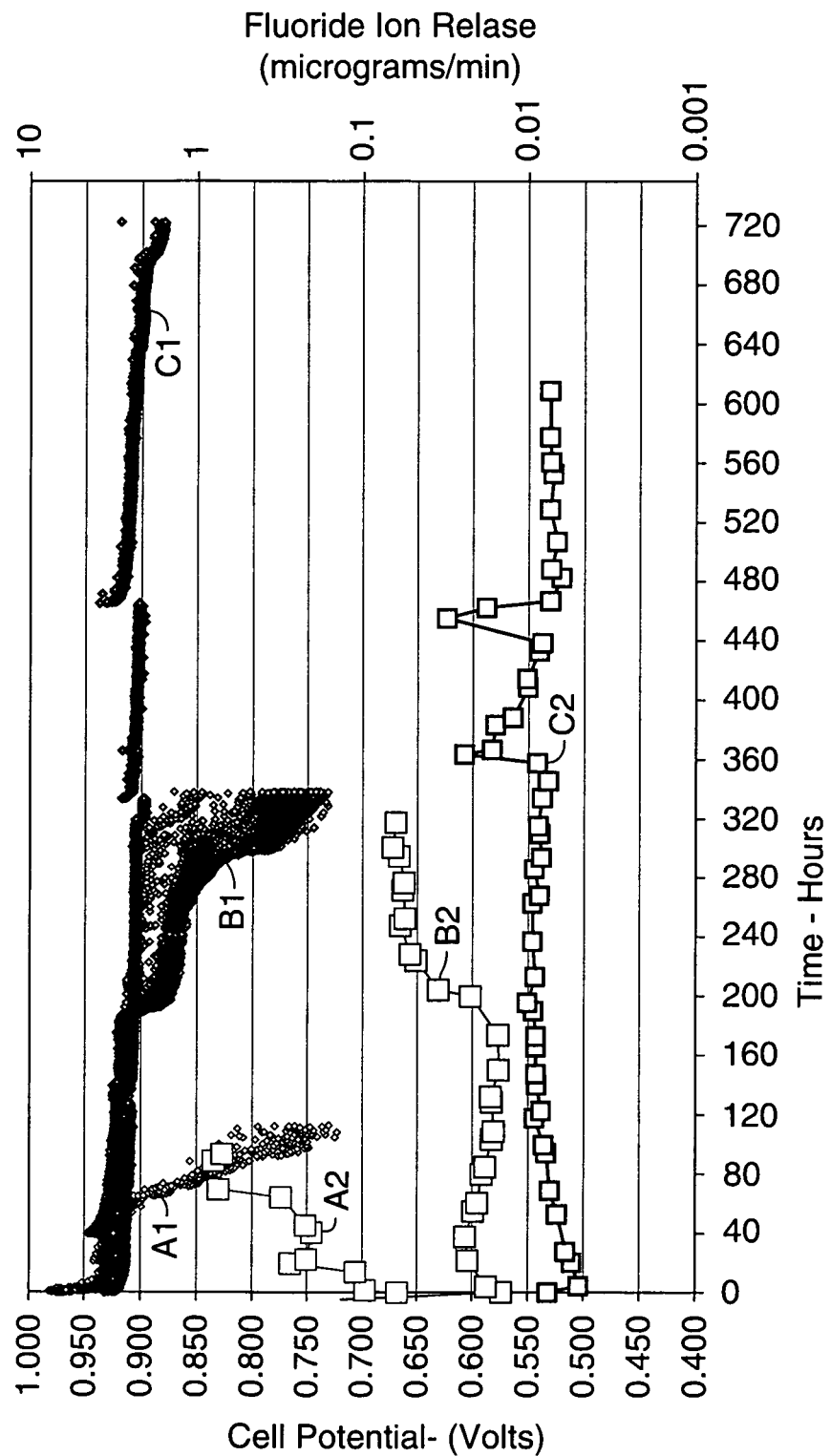

HIGH DURABILITY FUEL CELL COMPONENTS WITH CERIUM SALT ADDITIVES

This invention was made with Government support under Cooperative Agreement DE-FC36-02AL67621 awarded by DOE. The Government has certain rights in this invention.

FIELD OF THE INVENTION

This invention relates to fuel cell membrane electrode assemblies and fuel cell polymer electrolyte membranes comprising bound anionic functional groups and polyvalent cerium cations which demonstrate increased durability, and methods of making same.

BACKGROUND OF THE INVENTION

U.S. Pat. No. 6,335,112 (Asukabe) purportedly discloses a polymer electrolyte membrane comprising a hydrocarbon-based solid polymer electrolyte which contains a catalyst that decomposes peroxides. The references calls out numerous elements for use in the catalyst.

US 2003/0008196 (Wessel) purportedly discloses a fuel cell electrode containing a catalyst that decomposes peroxides. The references calls out numerous elements for use in the catalyst.

US 2002/0093008 and US 2004/0251450 (Kerres) purportedly disclose a composite membrane which includes a percolating ceramic nanoparticle network of very small particles for proton conduction.

Copolymers of tetrafluoroethylene (TFE) and a co-monomer according to the formula: $FSO_2-CF_2-CF_2-O-CF(CF_3)-CF_2-O-CF=CF_2$ are known and sold in sulfonic acid form, i.e., with the $FSO_2-$ end group hydrolyzed to $HSO_3-$, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: $FSO_2-CF_2-CF_2-O-CF=CF_2$ are known and used in sulfonic acid form, i.e., with the $FSO_2-$ end group hydrolyzed to $HSO_3-$, in making polymer electrolyte membranes for use in fuel cells.

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendant groups according to the formula:

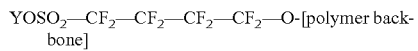

where Y is $H^+$ or a monovalent cation such as an alkali metal cation. Typically, the membrane is a cast membrane. Typically, the polymer has a hydration product of greater than 22,000. Typically, the polymer has an equivalent weight of 800-1200.

SUMMARY OF THE INVENTION

Briefly, the present invention provides a fuel cell membrane electrode assembly comprising a polymer electrolyte membrane which comprises a polymer that comprises bound anionic functional groups, wherein the polymer electrolyte membrane additionally comprises cerium cations. Typically, the amount of cerium cations present is between 0.001 and 0.5 charge equivalents based on the molar amount of anionic functional groups present in the polymer electrolyte, more typically between 0.005 and 0.2, more typically between 0.01 and 0.1, and more typically between 0.02 and 0.05. Typically, the distribution of cerium cations across the thickness of the polymer electrolyte membrane is uniform. Typically the cations are $Ce^{3+}$ cations or $Ce^{4+}$ cations. The polymer may have an equivalent weight of 1200 or less, more typically 1000 or less, and is in some embodiments 900 or less or 800 or less. The polymer may be highly fluorinated or perfluorinated, and may comprise pendent groups according to the formula: $-O-CF_2-CF_2-CF_2-CF_2-SO_3H$ or the formula: $-O-CF_2-CF(CF_3)-O-CF_2-CF_2-SO_3H$.

In another aspect, the present invention provides a fuel cell membrane electrode assembly comprising a polymer electrolyte membrane which comprises a polymer that comprises bound anionic functional groups, wherein at least a portion of the anionic functional groups are in acid form and at least a portion of the anionic functional groups are neutralized by cerium cations. Typically, the amount of cerium cations present is between 0.001 and 0.5 charge equivalents based on the molar amount of anionic functional groups present in the polymer electrolyte, more typically between 0.005 and 0.2, more typically between 0.01 and 0.1, and more typically between 0.02 and 0.05. Typically, the distribution of cerium cations across the thickness of the polymer electrolyte membrane is uniform. Typically the cations are $Ce^{3+}$ cations or $Ce^{4+}$ cations. The polymer may have an equivalent weight of 1200 or less, more typically 1000 or less, and is in some embodiments 900 or less or 800 or less. The polymer may be highly fluorinated or perfluorinated, and may comprise pendent groups according to the formula: $-O-CF_2-CF_2-CF_2-CF_2-SO_3H$ or the formula: $-O-CF_2-CF(CF_3)-O-CF_2-CF_2-SO_3H$.

In another aspect, the present invention provides a polymer electrolyte membrane which comprises a polymer that comprises bound anionic functional groups, wherein the polymer electrolyte membrane additionally comprises cerium cations, and wherein the amount of cerium cations present is between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Typically, the distribution of cerium cations across the thickness of the polymer electrolyte membrane is uniform. Typically the cations are $Ce^{3+}$ cations or $Ce^{4+}$ cations. The polymer may have an equivalent weight of 1200 or less, more typically 1000 or less, and is in some embodiments 900 or less or 800 or less. The polymer may be highly fluorinated or perfluorinated, and may comprise pendent groups according to the formula: $-O-CF_2-CF_2-CF_2-CF_2-SO_3H$ or the formula: $-O-CF_2-CF(CF_3)-O-CF_2-CF_2-SO_3H$.

In another aspect, the present invention provides a polymer electrolyte membrane which comprises a polymer that comprises bound anionic functional groups, wherein at least a portion of the anionic functional groups are in acid form and at least a portion of the anionic functional groups are neutralized by cerium cations, and wherein the amount of cerium cations present is between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Typically, the distribution of cerium cations across the thickness of the polymer electrolyte membrane is uniform. Typically the cations are $Ce^{3+}$ cations or $Ce^{4+}$ cations. The polymer may have an equivalent weight of 1200 or less, more typically 1000 or less, and is in some embodiments 900 or less or 800 or less. The polymer may be highly fluorinated or perfluorinated, and may comprise pendent groups according to the formula: —O—$CF_2$—$CF_2$—$CF_2$—$CF_2$—$SO_3H$ or the formula: —O—$CF_2$—$CF(CF_3)$—O—$CF_2$—$CF_2$—$SO_3H$.

In another aspect, the present invention provides a method of making a polymer electrolyte membrane comprising the steps of: a) providing a polymer electrolyte comprising bound anionic functional groups; b) adding 0.001 to 0.5 charge equivalents of one or more cerium salts, based on the molar amount of the acidic functional groups; and c) forming a membrane comprising the polymer electrolyte. More typically between 0.005 and 0.2 charge equivalents are added, more typically between 0.01 and 0.1, and more typically between 0.02 and 0.05. Typically the cations are $Ce^{3+}$ cations or $Ce^{4+}$ cations. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—$CF_2$—$CF_2$—$CF_2$—$CF_2$—$SO_3H$ or the formula: —O—$CF_2$—$CF(CF_3)$—O—$CF_2$—$CF_2$—$SO_3H$. The polymer electrolyte membrane thus formed may be incorporated into a membrane electrode assembly.

In this application:

"uniform" distribution of an additive in a polymer membrane means that the amount of additive present does not vary more than +/−90%, more typically not more than +/−50% and more typically not more than +/−20%;

"equivalent weight" (EW) of a polymer means the weight of polymer which will neutralize one equivalent of base;

"polyvalent cation" means a cation having a charge of 2+ or greater;

"highly fluorinated" means containing fluorine in an amount of 40 wt % or more, typically 50 wt % or more and more typically 60 wt % or more; and "acid form" means, with regard to an anionic functional group, that it is neutralized by a proton.

It is an advantage of the present invention to provide a fuel cell membrane electrode assembly and polymer electrolyte membrane and methods of making same which provide increased durability.

BRIEF DESCRIPTION OF THE DRAWING

FIG. 1 is a graph reporting results from a Fuel Cell Lifetime Test for three membrane electrode assemblies (MEA's), including cell potential for the Example 9C comparative MEA (Trace A1, left-hand scale), cell potential for the Example 10 MEA of the invention (Trace C1, left-hand scale), cell potential for a comparative MEA comprising Mn salt additive (Trace B1, left-hand scale), fluoride ion release rate for the Example 9C comparative MEA (Trace A2, right-hand scale), fluoride ion release rate for the Example 10 MEA of the invention (Trace C2, right-hand scale), and fluoride ion release rate for a comparative MEA comprising Mn salt additive (Trace B2, right-hand scale).

DETAILED DESCRIPTION

The present invention provides a polymer electrolyte membrane (PEM) which comprises a polymer that comprises bound anionic functional groups and cerium cations, or a fuel cell membrane electrode assembly (MEA) comprising such a PEM. Typically, at least a portion of the anionic functional groups are in acid form and at least a portion of the anionic functional groups are neutralized by the Ce cations. Typically, the amount of cerium cations present is between 0.001 and 0.5 charge equivalents based on the molar amount of acid functional groups present in the polymer electrolyte. Typically, the distribution of the cerium cations across the thickness of the PEM is uniform.

A membrane electrode assembly (MEA) or polymer electrolyte membrane (PEM) according to the present invention may be useful in electrochemical cell such as a fuel cell. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The PEM according to the present invention may comprise any suitable polymer electrolyte. The polymer electrolytes useful in the present invention typically bear anionic functional groups bound to a common backbone, which are typically sulfonic acid groups but may also include carboxylic acid groups, imide groups, amide groups, or other acidic functional groups. The polymer electrolytes useful in the present invention are typically highly fluorinated and most typically perfluorinated, but may also be partially fluorinated or non-fluorinated. The polymer electrolytes useful in the present invention are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2$—$CF_2CF_2CF_2CF_2$—O—CF=$CF_2$, described in U.S. patent application Ser. Nos. 10/322,254, 10/322,226 and 10/325,278, which are incorporated herein by reference. The polymer typically has an equivalent weight (EW) of 1200 or less and more typically 1100 or less. In some embodiments, polymers of unusually low EW can be used, typically 1000 or less, more typically 900 or less, and more typically 800 or less, often with improved performance in comparison to the use of higher EW polymer. Without wishing to be bound by theory, it is believed that polyvalent cerium ions may strengthen the polymer by forming crosslinks between bound anionic groups.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and most typically about 25 microns.

In one embodiment of the present invention, a salt of cerium is added to the acid form polymer electrolyte prior to membrane formation. Typically the salt is mixed well with or dissolved within the polymer electrolyte to achieve substantially uniform distribution. As used herein, cerium salt means a compound including cerium cations wherein the positive charge of ionized cerium is balanced by an equal negative charge of an anion, excluding compounds comprising $O^{2-}$ oxygen anions as the primary counterions to the cerium cations; i.e., excluding cerium oxides. The salt may comprise any suitable anion, including chloride, bromide, hydroxide, nitrate, carbonate, sulfonate, phosphate, and acetate and the like. More than one anion may be present. Inorganic and/or organic anions may be present. Suitable cerium salts may also contain additional non-cerium organic or inorganic cations, including other metal cations or other ammonium cations, including organic ammonium cations. When cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Cerium cations may be in any suitable oxidation state, including $Ce^{3+}$ and $Ce^{4+}$. Without wishing to be bound by theory, it is believed that at least a portion of the cerium cations persist in the polymer electrolyte because they are exchanged with $H^+$ ions from the anion groups of the polymer electrolyte and become associated with those anion groups. Furthermore, it is believed that polyvalent cerium cations may form crosslinks between anion groups of the polymer electrolyte, further adding to the stability of the polymer. However, in some embodiments cerium salts may be present in solid or precipitate form. In still other embodiments, cerium cations may be present in a combination of two or more forms including solvated cation, cation associated with bound anion groups of the PEM, and cation bound in a cerium salt precipitate. The amount of salt added is typically an amount which provides between 0.001 and 0.5 charge equivalents of cerium ion based on the molar amount of acid functional groups present in the polymer electrolyte, more typically between 0.005 and 0.2, more typically between 0.01 and 0.1, and more typically between 0.02 and 0.05.

In another embodiment of the present invention, the polymer electrolyte is formed into a PEM or PEM precursor, such as a roll good or a shot of material for molding, prior to treatment. A solution or suspension of one or more cerium salts, such as are described above, is applied to the PEM or PEM precursor, e.g., by coating the PEM or PEM precursor with the solution or suspension or immersing the PEM or PEM precursor in the solution or suspension. The solution or suspension may be in any suitable carrier, such as a solvent or solvent system, which typically includes water, alcohols, and the like. Immersion time and temperature may be any suitable for addition to the PEM or PEM precursor of between 0.001 and 0.5 charge equivalents of cerium ion based on the molar amount of acid functional groups present in the polymer electrolyte, more typically between 0.005 and 0.2, more typically between 0.01 and 0.1, and more typically between 0.02 and 0.05. The PEM precursor may be formed into a PEM by any suitable means, including cutting, especially of roll goods, and molding, especially of a shot of material for molding, and the like or combinations thereof.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

In one embodiment of the present invention, the electrode or the catalyst ink comprises a polymer that comprises bound anionic functional groups and cerium cations, as provided herein for polymers comprising a PEM according to the present invention. Typically, at least a portion of the anionic functional groups are in acid form and at least a portion of the anionic functional groups are neutralized by the Ce cations, as provided herein for polymers comprising a PEM according to the present invention.

A PEM according to the present invention may additionally comprise a porous support, such as a layer of expanded PTFE or the like, where the pores of the porous support contain the polymer electrolyte. A PEM according to the present invention may comprise no porous support. A PEM according to the present invention may comprise a crosslinked polymer.

To make an MEA, GDL's may be applied to either side of a CCM by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Membrane Preparation

The ionomer used in each of the following Examples is a copolymer of tetrafluoroethylene (TFE) and FSO2—CF2CF2CF2CF2—O—CF=CF2 (Comonomer A). Comonomer A was made according to the procedures disclosed in U.S. patent application Ser. Nos. 10/322,254 and 10/322,226, incorporated herein by reference. Polymerization was performed by aqueous emulsion polymerization as described in U.S. patent application Ser. No. 10/325,278. The equivalent weight (EW) was 1000 (ion exchange capacity of 0.001 mol per gram). The ionomer was provided in a casting solution containing 22.3% solids in 70:30 n propanol/water. The casting solution contained iron at a level of less than 1 ppm. Membranes were made by casting the dispersions on window glass by hand-spread technique using the 0.020 inch (0.0508 cm) gap of a 4-inch multiple clearance applicator (Cat. No. PAR-5357, BYK-Gardner, Columbia, Md.). The membrane films were dried in ambient air for 15 minutes, followed by drying in an 80° C. air oven for 10 minutes, followed by heating in a 200° C. air oven for 15 minutes.

Peroxide Soak Test

Oxidative stability of the perfluorinated ionomer membranes made in several of the examples was tested as follows. A sample of membrane weighing between 0.03 g and 0.06 g was carefully weighed and then immersed in 50 g of hydrogen peroxide solution (1 M starting concentration) in a glass jar. The jar was sealed and placed in an oven at 90-95° C. for 5 days. After a 5-day soak period, the sample was removed from solution, rinsed with DI water, dried at room temperature for at least three hours, and weighed. A raw weight loss figure was calculated. In order to control for differences in weight before and after soaking that can be attributed to changes in ambient relative humidity between day 0 and day 5, a separate piece of each membrane sample (that is never exposed to the peroxide) was weighed at the beginning and at the end of the soak period. To arrive at a corrected weight loss reading, the calculated figure for raw weight fraction remaining after soaking (for the soaked sample) was first divided by the weight fraction "remaining" for the piece of membrane that was not soaked. The latter treatment assumes that the effect of weight change due to a change in relative humidity is multiplicative in its deviating effect on measured weight loss for the soaked sample.

Acid Content Measurement

Titrations were performed to determine the acid content of ionomer membranes prepared with addition of ionic cerium. For each titration, a carefully weighed sample of ionomer film, approximately 0.05 g, was added to 100 ml of 0.1 M NaCl solution. 0.05 M NaOH solution was slowly added to the sample solution using a burette and the end point was determined using a pH meter. The amount of NaOH necessary to neutralize the acid was taken as the acid content of the membrane.

MEA Fabrication

Fuel cell membrane electrode assemblies (MEA's) having 50 $cm^2$ of active area were prepared as follows. Catalyst dispersions were prepared according to the method described in WO 2002/061,871, incorporated herein by reference. To prepare catalyst-coated membranes, anode and cathode layers were applied to membranes according to the decal transfer method described in the same reference, WO 2002/061,871. PTFE-treated carbon paper gas diffusion layers and polytetrafluoroethylene/glass composite gaskets were applied to the CCM by pressing in a Carver Press (Fred Carver Co., Wabash, Ind.) with 13.4 kN of force at 132° C. for 10 minutes.

MEA Lifetime Test

The MEA's were tested in a test station with independent controls of gas flow, pressure, relative humidity, and current or voltage (Fuel Cell Technologies, Albuquerque, N. Mex.). The test fixture included graphite current collector plates with quad-serpentine flow fields. MEA's were operated with $H_2$/air under subsaturated conditions at 90° C. with anode overpressure. The MEA's were subjected to an accelerated load cycle lifetime test by imposition of a variety of current density values. After each load cycle, the open circuit voltage (OCV) of the cell was measured and recorded. The general phenomenology for such a test protocol is for the OCV to decay monotonically, but with a distinct "knee" or pronounced increase in the decay rate. The point at which the decay rate increases can be taken as the lifetime of the MEA. As an alternative, a lower threshold voltage value can be selected to indicate the end of life for an MEA. The evolution rate of fluoride ions in the effluent water of the operating fuel cell was also measured by ion chromatography. A higher fluoride evolution rate indicates more rapid degradation for fluoropolymer membranes.

Comparative Example 1C

A control membrane was prepared according to details presented above, except that the casting dispersion included additional iron (500 ppm on a polymer weight basis), added as iron nitrate. 0.081 g of ferric nitrate ($Fe(NO_3)_3 \cdot 9H_2O$, (Product Number I110-500, Fisher Scientific, Fair Lawn, N.J.) was added to 99 g of 22.7 wt % ionomer casting dispersion with stirring for 24 hrs. The iron salt dissolved to give a clear casting dispersion. A membrane was cast according to the procedure given above. Table I reports the results of the Peroxide Soak Test and Acid Content Measurement for the membrane. Two samples were made and the reported results are the average of both samples.

Example 2

An aliquot of casting dispersion prepared according to Example 1C was further combined with ammonium cerium nitrate (ACN; $(NH_4)_2Ce(NO_3)_6$ (Product Number 33254, Alfa Aesar, Ward Hill, Mass.) at a cerium content of 0.02 mmols cerium per gram of polymer. 0.036 g of ammonium cerium nitrate (0.066 mmols) was combined with 14.64 g of ionomer solution (22.7 wt %) and stirred for 24 hours. The salt initially dissolved to give regions of clear yellow solution. After several hours, the mixture grew slightly turbid and colorless. A membrane was cast according to the procedure given above. Table I reports the results of the Peroxide Soak Test and Acid Content Measurement for the membrane. The addition of ammonium cerium nitrate reduced the weight loss of the perfluorinated ionomer, indicating a higher level of oxidative stability.

TABLE I

| Example | Peroxide Soak Test (% weight change) | acid content (meq/g) |
|---|---|---|
| 1C | −9.5% | 1.00 |
| 2 | −4.6% | 0.90 |

Comparative Example 3C

A control membrane was prepared according to the method described in Comparative Example 1C. Table II reports the results of the Peroxide Soak Test for the membrane. Two samples were made and the reported results are the average of both samples.

Example 4

An aliquot of polymer casting dispersion prepared according to Example 3C (measuring 23.3 wt % polymer and including 500 ppm iron) was further combined with $Ce(SO_4)_2$. 0.0068 g of $Ce(SO_4)_2$ (Product Number 35,900-9, Aldrich Chemical Company, Milwaukee, Wis.) was added to 4.34 g of the polymer dispersion, with stirring. The mass amounts above yield 0.67 wt % $Ce(SO_4)_2$, or 0.020 meq Ce/g, relative to the total mass of $Ce(SO_4)_2$ and polymer. The mixture was stirred for 8 hrs to yield a turbid casting dispersion. A membrane was cast according to the procedure given above. Table II reports the results of the Peroxide Soak Test for the membrane. Two samples were made and the reported results are the average of both samples.

Example 5

An aliquot of polymer casting dispersion prepared according to Example 3C (measuring 23.3 wt % polymer and including 500 ppm iron) was further combined with cerium carbonate hydrate, $Ce_2(CO_3)_3 \cdot xH_2O$. 0.0078 g of $Ce_2(CO_3)_3\text{-}xH_2O$ (Product Number 32,550-3, Aldrich Chemical Company, Milwaukee, Wis.) was added to 4.20 g of the polymer dispersion, with stirring. The mass amounts above yield 0.79 wt % $Ce_2(CO_3)_3\text{-}xH_2O$, or 0.024 meq Ce/g, relative to the total mass of $Ce_2(CO_3)_3\text{-}xH_2O$ and polymer. The mixture was stirred for 8 hrs to yield a slightly turbid casting dispersion. A membrane was cast according to the procedure given above. Table II reports the results of the Peroxide Soak Test for the membrane. Two samples were made and the reported results are the average of both samples.

Example 6

An aliquot of polymer casting dispersion prepared according to Example 3C (measuring 23.3 wt % polymer and including 500 ppm iron) was further combined with cerium acetate hydrate, $Ce(OOCCH_3)_3\text{-}xH_2O$ (x=1.56, determined gravimetrically). 0.0069 g of $Ce(OOCCH_3)_3\text{-}xH_2O$ (Product Number 93-5801, Strem Chemicals, Newburyport, Mass.) was added to 4.76 g of the polymer dispersion, with stirring. The mass amounts above yield 0.62 wt % $Ce(OOCCH_3)_3\text{-}xH_2O$, or 0.018 meq Ce/g, relative to the total mass of $Ce(OOCCH_3)_3\text{-}xH_2O$ and polymer. The mixture was stirred for 8 hrs to yield a slightly turbid casting dispersion. A membrane was cast according to the procedure given above. Table II reports the results of the Peroxide Soak Test for the membrane. Two samples were made and the reported results are the average of both samples.

Example 7

An aliquot of polymer casting dispersion prepared according to Example 3C (measuring 23.3 wt % polymer and including 500 ppm iron on a polymer weight basis) was further combined with cerium hydroxide, $Ce(OH)_4$. 0.0052 g of $Ce(OH)_4$ (Product Number 31,697-0, Aldrich Chemical Company, Milwaukee, Wis.) was added to 4.83 g of the polymer dispersion, with stirring. The mass amounts above yield 0.46 wt % $Ce(OH)_4$, or 0.022 meq Ce/g, relative to the total mass of $Ce(OH)_4$ and polymer. The mixture was stirred for 8 hrs to yield a slightly turbid casting dispersion. A membrane was cast according to the procedure given above. Table II reports the results of the Peroxide Soak Test for the membrane. Two samples were made and the reported results are the average of both samples.

Example 8

An aliquot of polymer casting dispersion prepared according to Example 3C (measuring 23.3 wt % polymer and including 500 ppm iron) was further combined with cerium hydroxide, $Ce(NO_3)_3 \cdot 6H_2O$. 0.0103 g of $Ce(NO_3)_3 \cdot 6H_2O$ (Product Number 31,697-0, Aldrich Chemical Company, Milwaukee, Wis.) was added to 4.57 g of the polymer dispersion, with stirring. The mass amounts above yield 0.96 wt % $Ce(NO_3)_3 \cdot 6H_2O$, or 0.022 meq Ce/g, relative to the total mass of $Ce(NO_3)_3 \cdot 6H_2O$ and polymer. The mixture was stirred for 8 hrs to yield a very slightly turbid casting dispersion. A membrane was cast according to the procedure given above. Table II reports the results of the Peroxide Soak Test for the membrane. Two samples were made and the reported results are the average of both samples.

TABLE II

| Example | Ce ion | Ce content (meq Ce/g) | Peroxide Soak Test (% weight change) |
|---|---|---|---|
| 3C | none | none | −14.6% |
| 4 | Ce+4 | 0.020 | −4.8% |

TABLE II-continued

| Example | Ce ion | Ce content (meq Ce/g) | Peroxide Soak Test (% weight change) |
|---|---|---|---|
| 5 | Ce+3 | 0.024 | −5.2% |
| 6 | Ce+3 | 0.018 | −6.3% |
| 7 | Ce+4 | 0.022 | −8.3% |
| 8 | Ce+3 | 0.022 | −5.1% |

Comparative Example 9C

A control membrane was prepared according to the method described in the Example of U.S. Pat. No. 6,649,295, incorporated herein by reference.

Example 10

A polymer casting dispersion was prepared as given in Example 9C above, and further combined with ammonium cerium nitrate $(NH_4)_2Ce(NO_3)_6$ (Product Number 33254, Alfa Aesar, Ward Hill, Mass.) at a cerium content of 0.02 mmols cerium per gram of polymer. 1.00 g of ammonium cerium nitrate (1.82 mmols) was combined with 400 g of ionomer solution (22.7 wt %) and stirred for 24 hours. The salt initially dissolved to give regions of clear yellow solution. After several hours, the mixture grew slightly turbid and colorless. The membrane was cast according to the method described in the Example of U.S. Pat. No. 6,649,295, incorporated herein by reference.

MEA's were fabricated as described above from the membranes of Examples 9C and 10. FIG. 1 reports results from the Fuel Cell Lifetime Test for these MEA's, including cell potential for the Example 9C comparative MEA (Trace A1, left-hand scale), cell potential for the Example 10 MEA of the invention (Trace C1, left-hand scale), fluoride ion release rate for the Example 9C comparative MEA (Trace A2, right-hand scale), and fluoride ion release rate for the Example 10 MEA of the invention (Trace C2, right-hand scale). For comparison, FIG. 1 additionally reports cell potential and fluoride ion release rate for a comparative MEA made with a Mn salt additive (Traces B1 and B2). The Example 10 MEA of the invention demonstrated dramatically extended lifetime and reduced fluoride ion evolution.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A fuel cell membrane electrode assembly comprising a polymer electrolyte membrane which comprises a polymer that comprises bound anionic functional groups, wherein said polymer electrolyte membrane additionally comprises at least one cerium salt where the at least one cerium salt includes cerium cations selected from the group consisting of $Ce^{3+}$ cations, $Ce^{4+}$ cations, and combinations thereof, wherein the total amount of cerium cations present is between 0.0025 and 0.033 mole equivalent based on the molar amount of anionic functional groups present in the polymer, wherein the distribution of the cerium cations across the thickness of said polymer electrolyte membrane is uniform, and wherein the polymer contains fluorine in an amount of at least 40 wt %.

2. The fuel cell membrane electrode assembly according to claim 1 where said cations are $Ce^{3+}$ cations only.

3. The fuel cell membrane electrode assembly according to claim 1 where said cations are $Ce^{4+}$ cations only.

4. The fuel cell membrane electrode assembly according to claim 1 wherein said polymer has an equivalent weight of 1000 or less.

5. The fuel cell membrane electrode assembly according to claim 1 wherein said polymer has an equivalent weight of 900 or less.

6. The fuel cell membrane electrode assembly according to claim 1 wherein said polymer has an equivalent weight of 800 or less.

7. The fuel cell membrane electrode assembly according to claim 1 wherein said polymer is perfluorinated.

8. The fuel cell membrane electrode assembly according to claim 1 wherein said polymer comprises pendent groups according to the formula:

$$-O-CF_2-CF_2-CF_2-CF_2-SO_3H.$$

9. The fuel cell membrane electrode assembly according to claim 1 wherein said polymer comprises pendent groups according to the formula:

$$-O-CF_2-CF(CF_3)-O-CF_2-CF_2-SO_3H.$$

10. A polymer electrolyte membrane which comprises a polymer that comprises bound anionic functional groups, wherein said polymer electrolyte membrane additionally comprises at least one cerium salt where the at least one cerium salt includes cerium cations selected from the group consisting of $Ce^{3+}$ cations, $Ce^{4+}$ cations, and combinations thereof, wherein the total amount of cerium cations present is between 0.0025 and 0.033 mole equivalent based on the molar amount of anionic functional groups present in the polymer, wherein the distribution of the cerium cations across the thickness of said polymer electrolyte membrane is uniform, and wherein the polymer contains fluorine in an amount of at least 40 wt %.

11. The polymer electrolyte membrane according to claim 10 where said cerium salt includes $Ce^{3+}$ cations only.

12. The polymer electrolyte membrane according to claim 10 where said cerium salt includes $Ce^{4+}$ cations only.

13. The polymer electrolyte membrane according to claim 10 wherein said polymer has an equivalent weight of 1000 or less.

14. The polymer electrolyte membrane according to claim 10 wherein said polymer has an equivalent weight of 900 or less.

15. The polymer electrolyte membrane according to claim 10 wherein said polymer has an equivalent weight of 800 or less.

16. The polymer electrolyte membrane according to claim 10 wherein said polymer is perfluorinated.

17. The polymer electrolyte membrane according to claim 10 wherein said polymer comprises pendent groups according to the formula:

$$-O-CF_2-CF_2-CF_2-CF_2-SO_3H.$$

18. The polymer electrolyte membrane according to claim 10 wherein said polymer comprises pendent groups according to the formula:

$$-O-CF_2-CF(CF_3)-O-CF_2-CF_2-SO_3H.$$

19. The fuel cell membrane electrode assembly according to claim 1 wherein said polymer electrolyte membrane additionally comprises a porous support.

20. The fuel cell membrane electrode assembly to claim 1 wherein said polymer electrolyte membrane does not comprise a porous support.

21. The fuel cell membrane electrode assembly according to claim 1 wherein said polymer is crosslinked.

* * * * *

UNITED STATES PATENT AND TRADEMARK OFFICE
CERTIFICATE OF CORRECTION

PATENT NO. : 8,628,871 B2
APPLICATION NO. : 11/262268
DATED : January 14, 2014
INVENTOR(S) : Matthew Frey et al.

It is certified that error appears in the above-identified patent and that said Letters Patent is hereby corrected as shown below:

Title Page 3, Column 1 (Other Publications)
Line 1, delete "Membrance" and insert -- Membrane --, therefor.

In the Claims
Column 13
Line 1, in Claim 20, delete "to claim" and insert -- according to claim --, therefor.

Signed and Sealed this
Second Day of September, 2014

Michelle K. Lee
*Deputy Director of the United States Patent and Trademark Office*